United States Patent
Ewel et al.

(10) Patent No.: US 10,428,564 B1
(45) Date of Patent: Oct. 1, 2019

(54) STORAGE CONTAINER WITH LATCH FOR SEATING ASSEMBLY

(71) Applicant: Ford Global Technologies, LLC, Dearborn, MI (US)

(72) Inventors: Adam D. Ewel, Royal Oak, MI (US); Johnathan Andrew Line, Northville, MI (US); Spencer Hoernke, Dundas (CA); Jimmy Moua, Canton, MI (US); Rodney Charles Brinker, Eastpointe, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 16/002,296

(22) Filed: Jun. 7, 2018

(51) Int. Cl.
| | | |
|---|---|---|
| *A47C 7/62* | (2006.01) | |
| *E05B 83/28* | (2014.01) | |
| *E05B 79/20* | (2014.01) | |
| *B60R 7/04* | (2006.01) | |
| *E05B 85/24* | (2014.01) | |
| *E05C 9/08* | (2006.01) | |

(52) U.S. Cl.
CPC .............. *E05B 83/28* (2013.01); *B60R 7/043* (2013.01); *E05B 79/20* (2013.01); *E05B 85/24* (2013.01); *E05C 9/08* (2013.01)

(58) Field of Classification Search
CPC .................................................... B60R 7/043
USPC ........................................ 297/188.04, 188.07
See application file for complete search history.

(56) References Cited

U.S. PATENT DOCUMENTS

| | | | |
|---|---|---|---|
| 6,059,358 A | 5/2000 | Demick et al. | |
| 6,199,948 B1 | 3/2001 | Bush et al. | |
| 6,702,375 B1 | 3/2004 | Laskowski et al. | |
| 7,300,105 B2* | 11/2007 | Jasinski, II | B60N 2/206 |
| | | | 297/188.07 X |
| 7,562,931 B2* | 7/2009 | Stojanovic | B60N 2/3013 |
| | | | 297/188.07 X |
| 7,611,183 B2* | 11/2009 | Burkey | B60N 2/206 |
| | | | 297/188.07 X |
| 7,963,597 B2* | 6/2011 | Bostrom | A62B 9/04 |
| | | | 297/188.04 X |
| 8,052,209 B2* | 11/2011 | Bostrom | A62B 9/04 |
| | | | 297/188.04 X |
| 8,469,324 B2* | 6/2013 | Bostrom | A62B 9/04 |
| | | | 224/275 |
| 9,290,112 B2* | 3/2016 | Rouxel | B60N 3/001 |
| 9,758,064 B1 | 9/2017 | Dry et al. | |

(Continued)

FOREIGN PATENT DOCUMENTS

| | | |
|---|---|---|
| DE | 102013105012 A1 | 11/2014 |
| JP | 4123522 B2 | 7/2008 |
| JP | 4135534 B2 | 8/2008 |

OTHER PUBLICATIONS

Sweet and Simple Magazine, "Sweet Ride 2014 * the Rugged Hauler * Nissan Titan Pro-4X," 2014 (5 pages).

*Primary Examiner* — Rodney B White

(74) *Attorney, Agent, or Firm* — Vichit Chea; Price Heneveld LLP

(57) ABSTRACT

A storage container for a vehicle seating assembly includes a base of the storage container affixed to a seatback. A panel is coupled to the base. A latch mechanism is disposed in the base and adjacent to the panel, wherein the latch mechanism is selectively operable between locked and unlocked positions to move the panel between respective secured and unsecured positions.

18 Claims, 13 Drawing Sheets

(56) References Cited

U.S. PATENT DOCUMENTS

2005/0161480 A1 7/2005 Tirey
2005/0248189 A1 11/2005 Prasatek et al.
2015/0001898 A1 1/2015 Line et al.

* cited by examiner

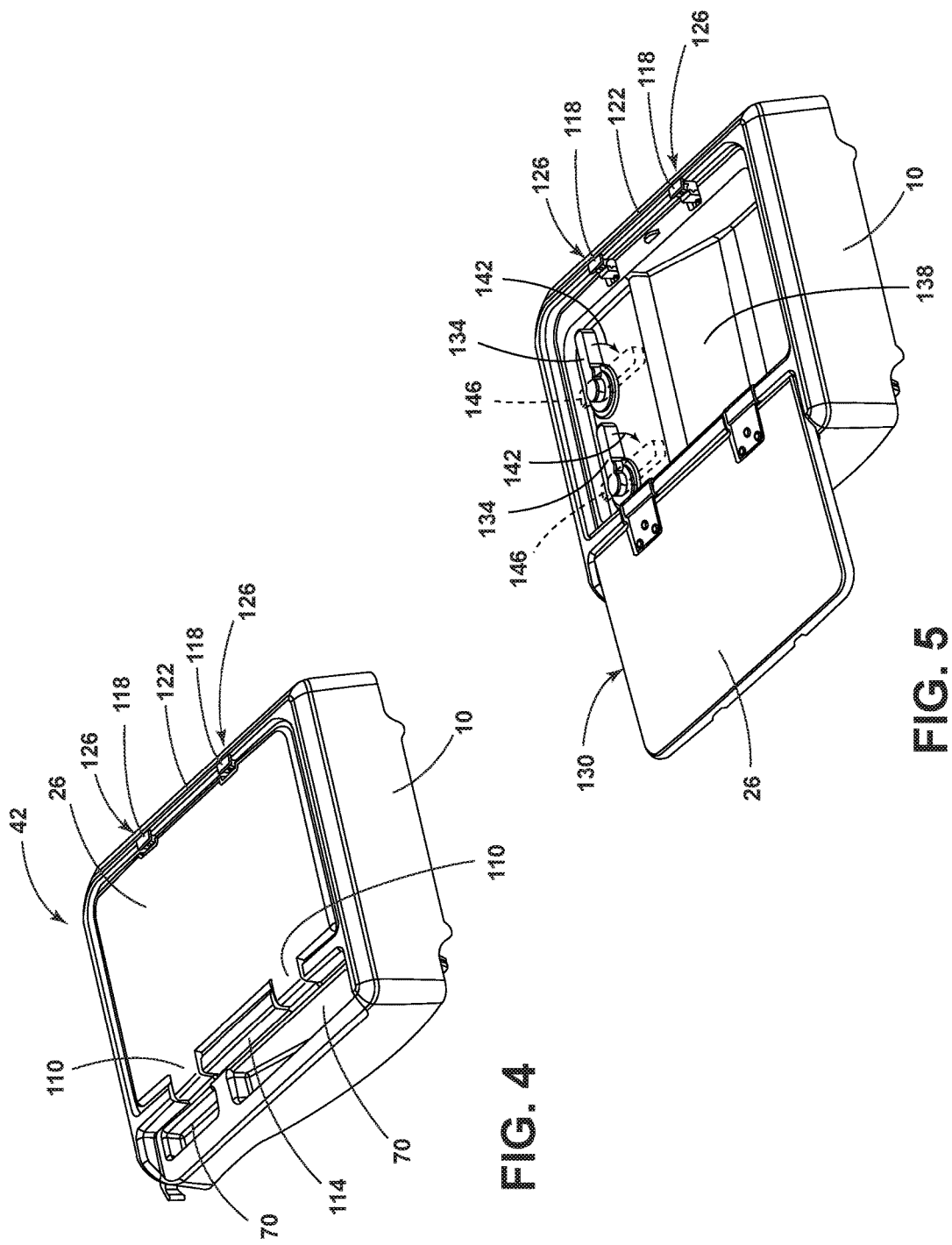

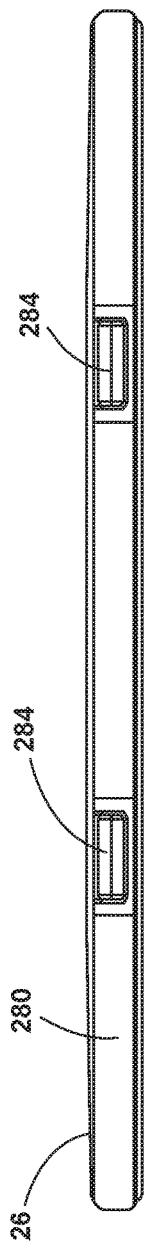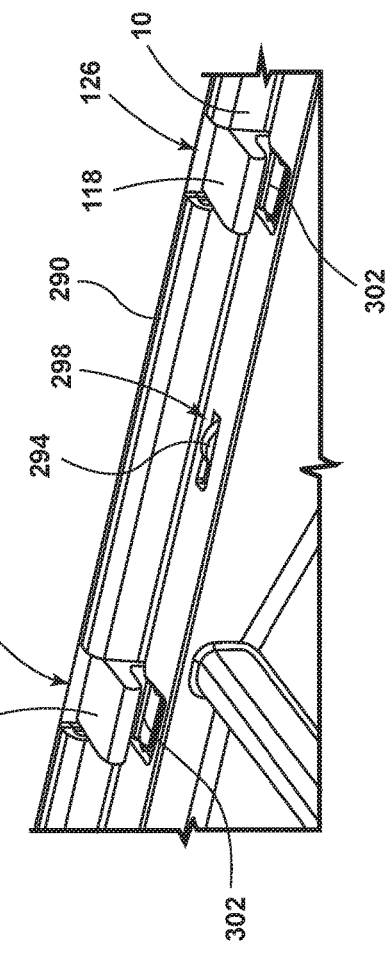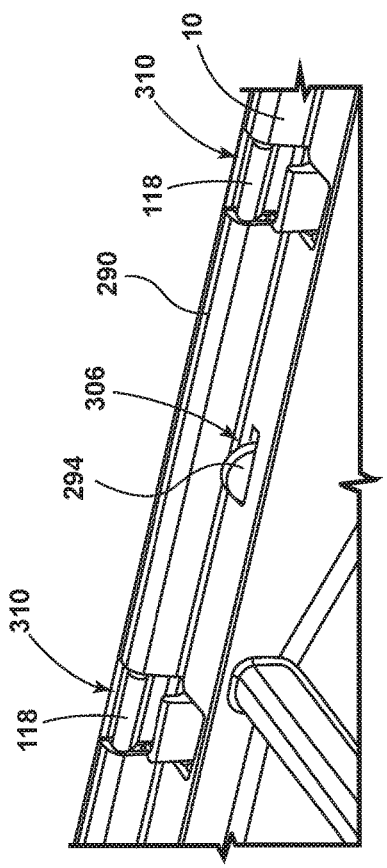

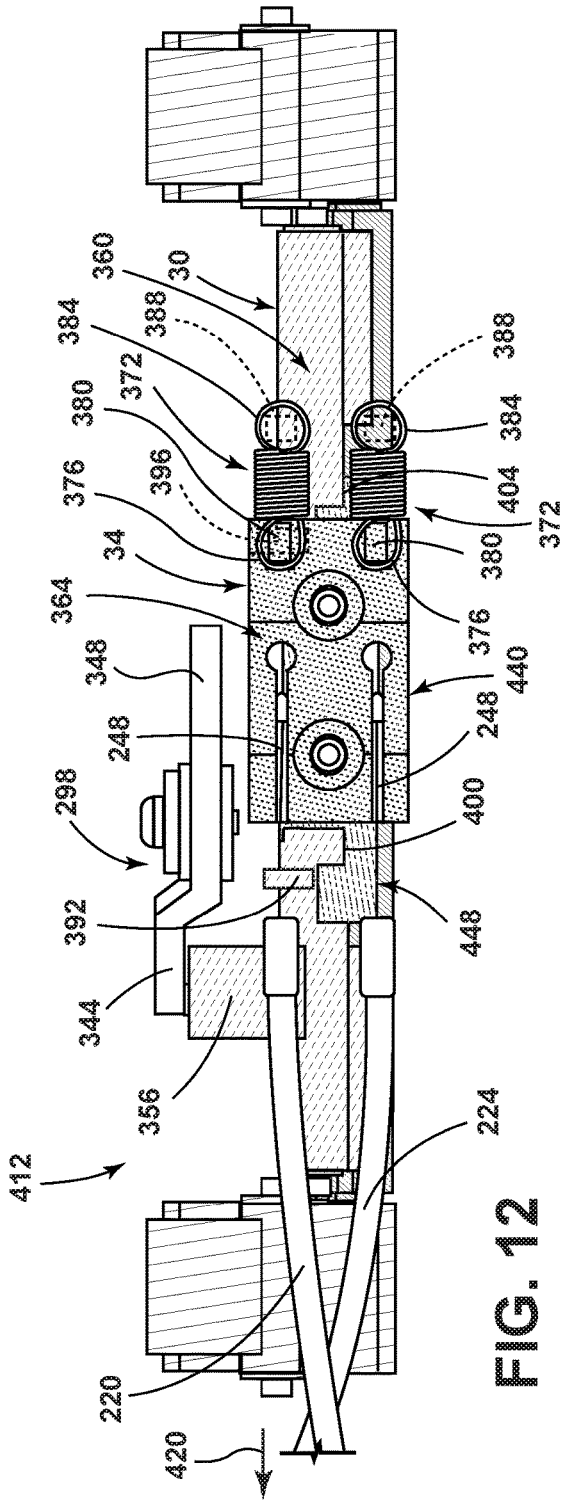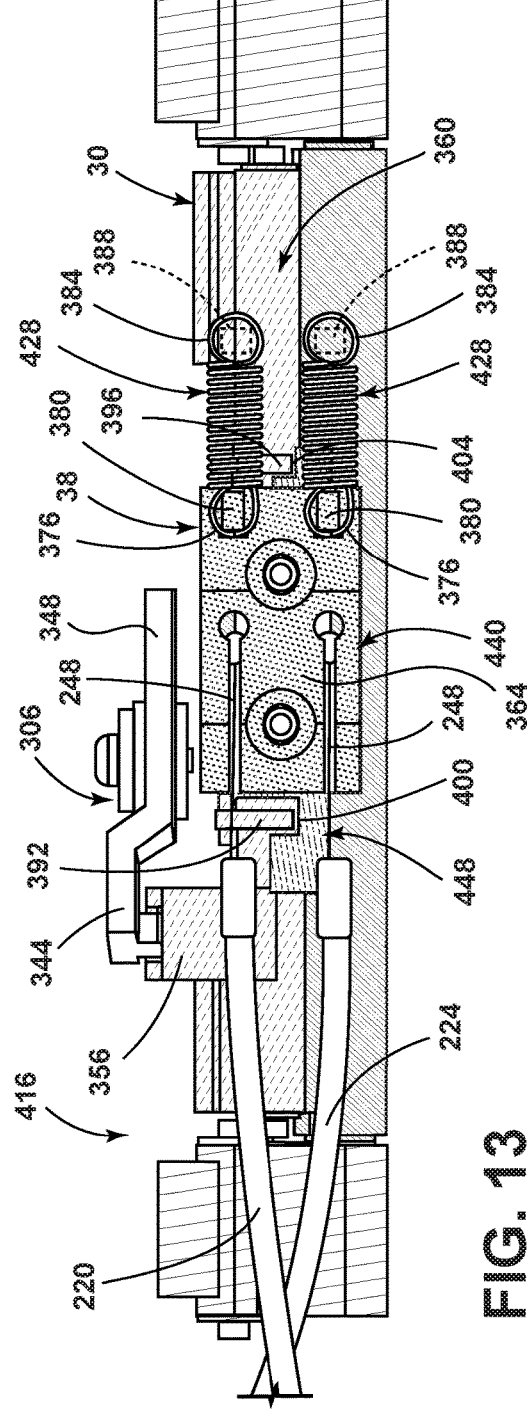

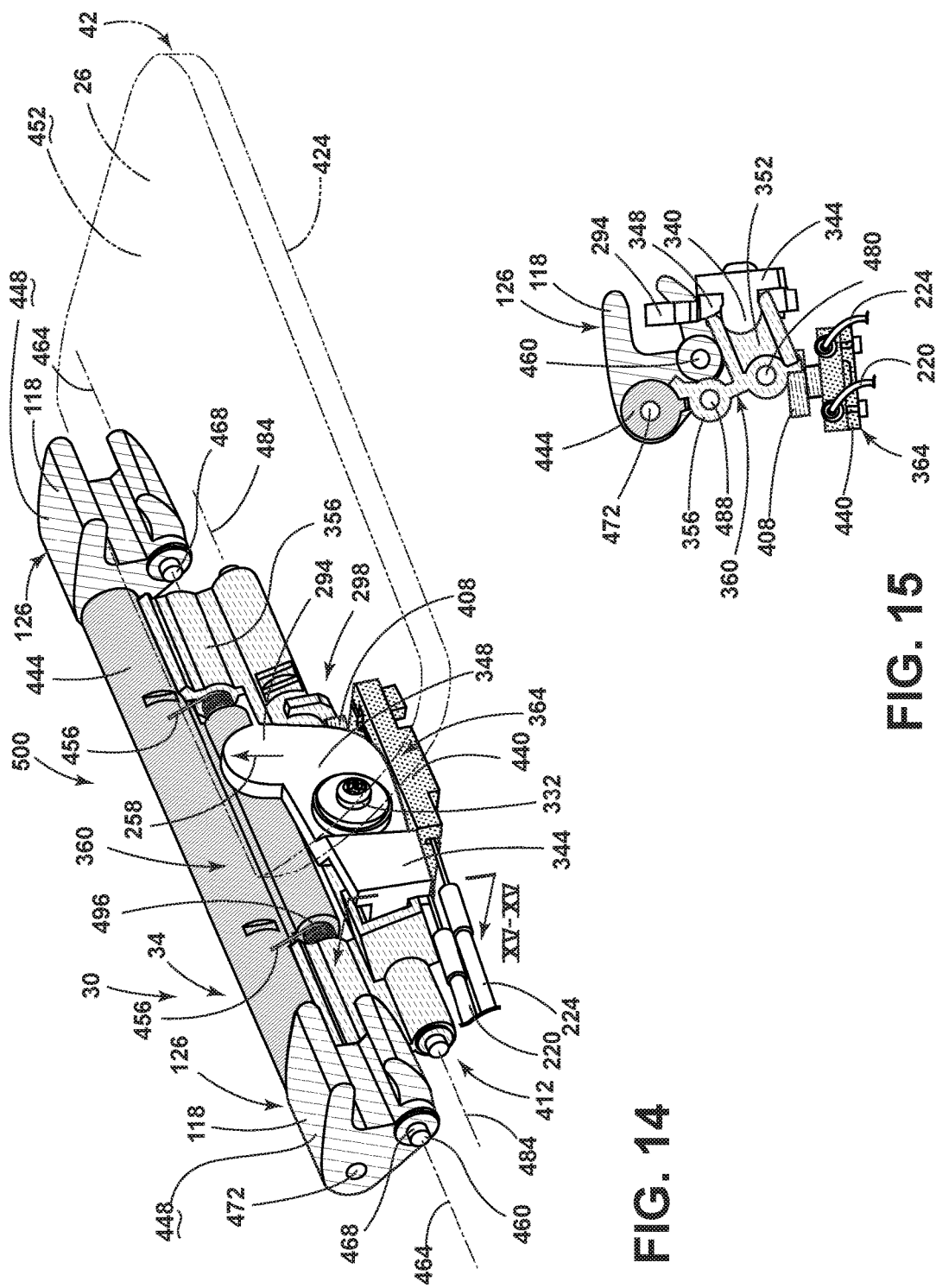

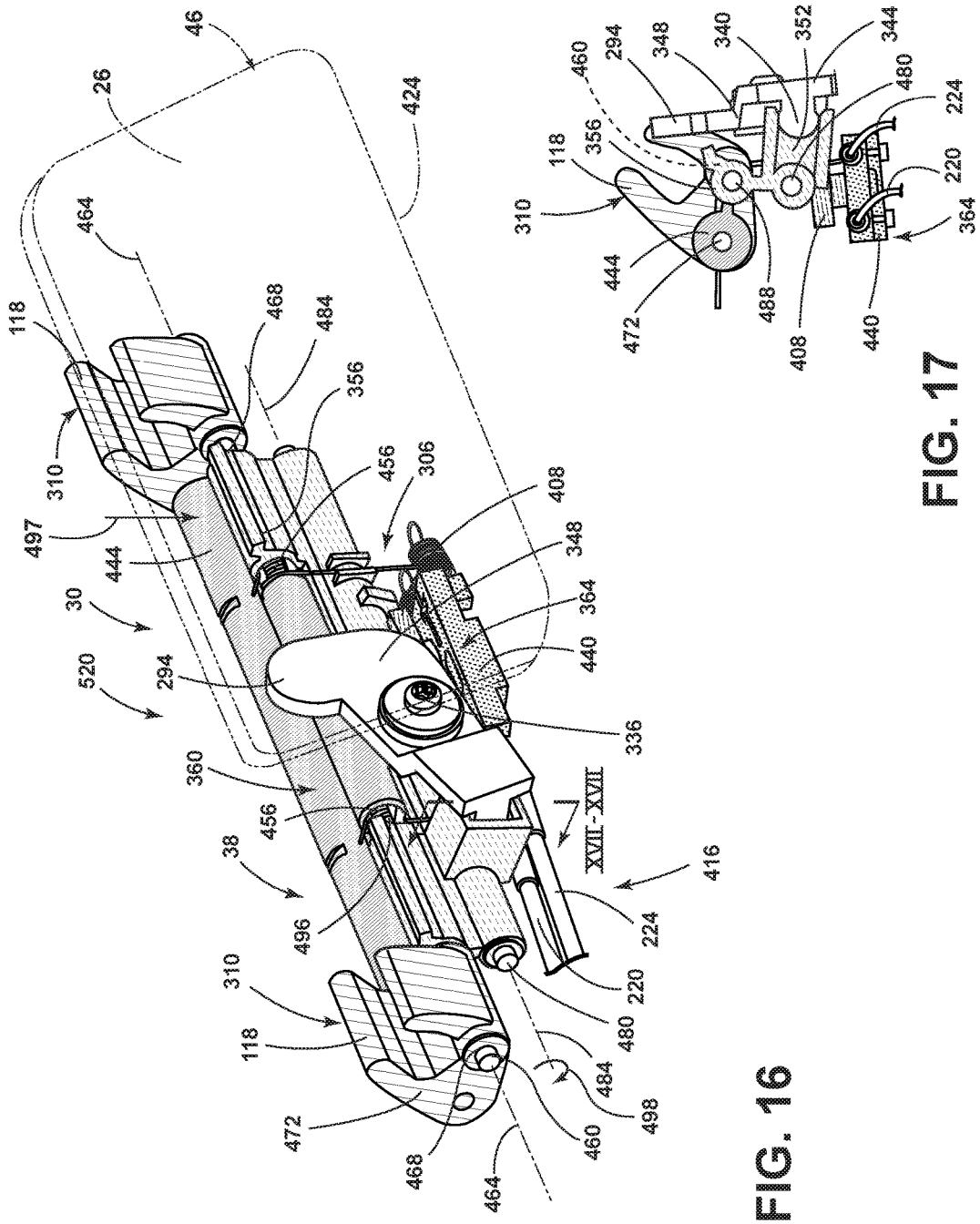

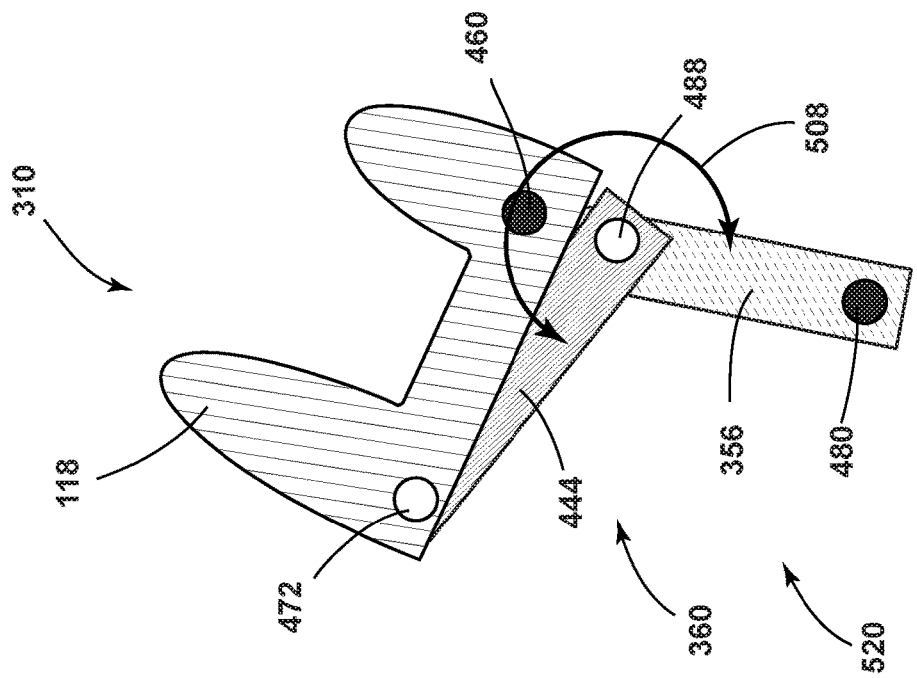
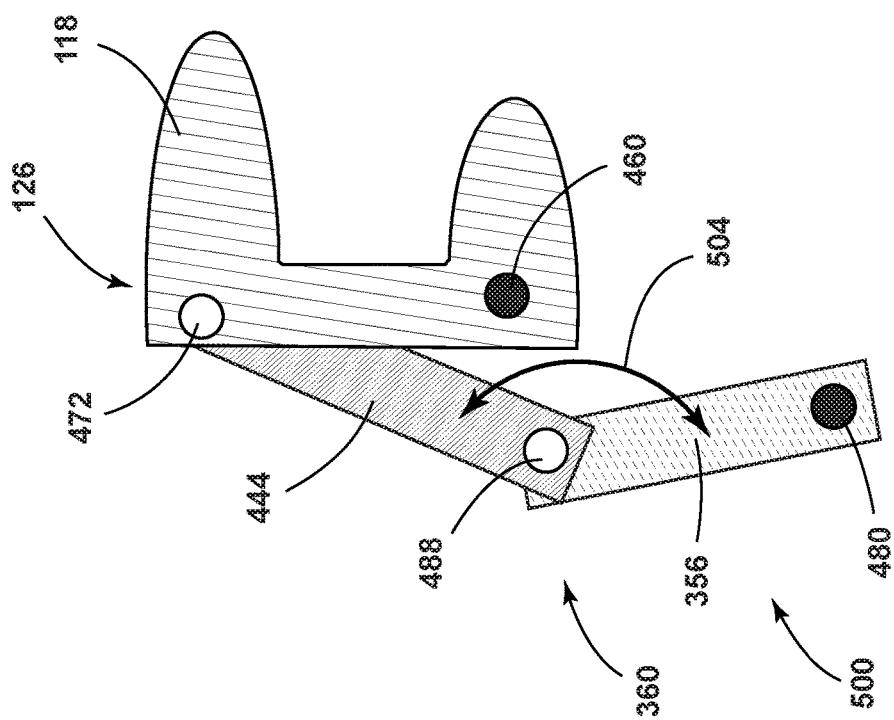
FIG. 19
FIG. 18

STORAGE CONTAINER WITH LATCH FOR SEATING ASSEMBLY

FIELD OF THE DISCLOSURE

The present disclosure generally relates to vehicle seating assemblies, and more particularly to storage areas for vehicle seating assemblies.

BACKGROUND OF THE DISCLOSURE

Seating assemblies typically include a seatback to support a back of an occupant in an upright sitting position and various recline positions. Similar to other areas of the vehicle interior, such as consoles and door trim panels, seatbacks commonly include storage areas for passenger items. However, improved seatback storage areas for passenger items are always desired.

SUMMARY OF THE DISCLOSURE

According to one aspect of the present disclosure, a storage container for a vehicle seating assembly includes a base of the storage container affixed to a seatback. A panel is coupled to the base. A latch mechanism is disposed in the base and adjacent to the panel, wherein the latch mechanism is selectively operable between locked and unlocked positions to move the panel between respective secured and unsecured positions.

Embodiments of the first aspect of the disclosure can include any one or a combination of the following features:
  the latch mechanism includes an actuator assembly and an arm assembly retained in a housing, wherein linear movement of the actuator assembly from a rest position to an activation position causes rotation of the arm assembly from a first position to a second position;
  a cam member coupled to the arm assembly, wherein rotation of the arm assembly from the first position to the second position causes the cam member to move from a stored position to a deployed position;
  the cam member is disposed adjacent to the panel and wherein movement of the cam member from the stored position to the deployed position causes the cam member to contact the panel and to exert a force on the panel to move the panel from the secured position to an unsecured position;
  a spring member that exerts a spring force on the arm assembly to move the arm assembly from the first position to the second position;
  a striker, wherein the striker is coupled to the arm assembly;
  the striker includes an aperture for receiving an edge of the panel in the secured position;
  a top surface of the striker and a top surface of the panel are substantially parallel when the aperture in the striker receives an edge of the panel in the secured position;
  the spring member is a torsion spring;
  an activation force is applied to the actuator assembly to move the actuator assembly from a rest position to an activation position;
  a cable coupled to the actuator assembly and selectively operable to apply the activation force to the actuator assembly to move the actuator assembly from the rest position to the activation position; and
  the cable comprises a first end and a second end, wherein the first end is attached to the actuator assembly and the second end is secured in an inner wall of the storage container.

According to another aspect of the present disclosure, a vehicle seating assembly includes a seatback. A storage container is disposed on the seatback. The storage container includes a door, a latch mechanism, and a cable assembly having a first end coupled to the latch mechanism and a second end secured within the storage container, wherein a cable is selectively operable to move the latch mechanism from the locked position to the unlocked position.

Embodiments of the second aspect of the disclosure can include any one or a combination of the following features:
  a cam member, wherein the cam member is coupled to the latch mechanism and wherein moving the latch mechanism from a locked position to an unlocked position causes the cam member to move from a stored position to a deployed position so that the cam member exerts a force on the door to move the door from a secured position to an unsecured position;
  a handle is coupled to the second end of the cable assembly and wherein the handle is outside of the storage container;
  the second end of the cable assembly is secured in the inner wall of the storage container proximate a top edge of the storage container and wherein the handle is proximate the top edge of the storage container; and
  the cable assembly is one of a plurality of cable assemblies having a first end coupled to the latch mechanism and a handle coupled to the second end, wherein the handle is disposed outside of the storage container.

According to yet another aspect of the present disclosure, a selectively detachable storage container for a seating assembly includes a base affixed to a seatback. A panel is coupled to the base. A cam member is operable between a deployable position and a stored position and coupled to a latch mechanism operable between an unlocked position and a locked position, wherein the panel is selectively positionable to exert a closing force on the cam member and to move the cam member from the deployed position to the stored position to move the latch mechanism from the unlocked position to the locked position.

Embodiments of the third aspect of the disclosure can include any one or a combination of the following features:
  a biasing mechanism attached to the latch mechanism and wherein the biasing mechanism retracts an actuator assembly of the latch mechanism from an activation position to a rest position when the latch mechanism is moved from the unlocked position to the locked position; and
  the biasing mechanism comprises an extension spring including a first end coupled to the actuator assembly and a second end coupled to a housing, wherein the actuator assembly is disposed within the housing.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 4 is a top perspective view of the container with the panel in the secured position;

FIG. 5 is a top perspective view of the container with the panel in the fully open position;

FIG. 8 is a side elevational view of the panel according to one embodiment;

FIG. 9 is a side perspective view of a sidewall of the container with the cam member in the stored position and the strikers in the securing position according to an embodiment;

FIG. 10 is a side perspective view of a sidewall of the container with the cam member in the deployed position and the strikers in the non-securing position according to an embodiment;

FIG. 12 is a bottom plan view of the latch mechanism in a locked position and the cam member in a stored position;

FIG. 13 is a bottom plan view of a latch mechanism in an unlocked position and a cam member in a deployed position;

FIG. 14 is a side perspective view of the latch mechanism in a locked position, the cam member in the stored position, and the strikers in securing positions of an embodiment of the disclosure;

FIG. 15 is a cross-sectional view taken along line XV-XV of FIG. 14;

FIG. 16 is a side perspective view of the latch mechanism in an unlocked position, the cam member in a deployed position, and the strikers in non-securing positions of an embodiment of the disclosure;

FIG. 17 is a cross-sectional view taken along line XVII-XVII of FIG. 16 according to an embodiment;

FIG. 18 is a schematic view showing the arm assembly of the latch mechanism in the locked position and the striker in the securing position;

FIG. 19 is a schematic view showing the arm assembly of the latch mechanism in an unlocked position and the striker in the non-securing position.

DETAILED DESCRIPTION

Figure 1:
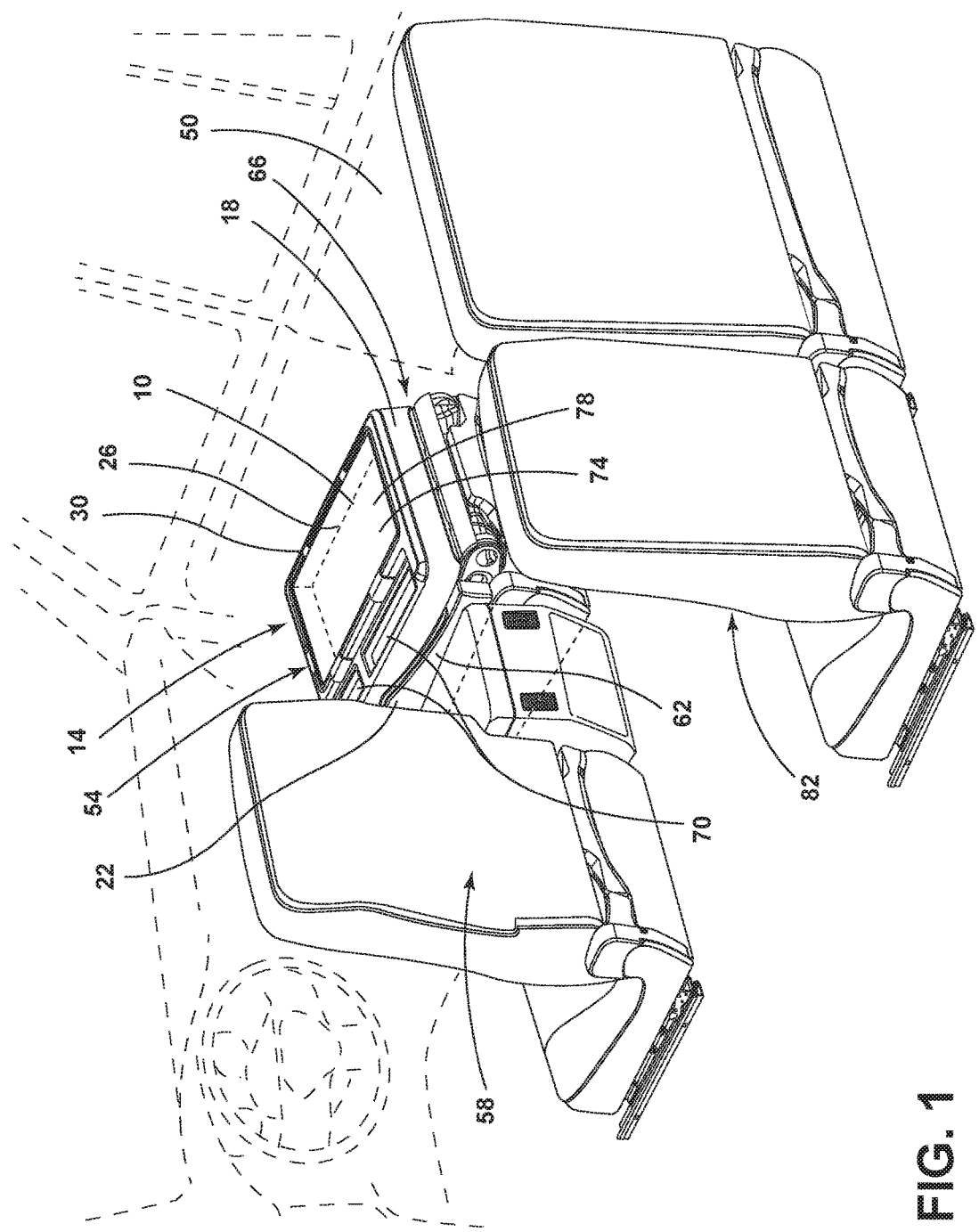
FIG. 1 is a side perspective view of a vehicle interior with a seatback including a container in a substantially horizontal position, according to one embodiment.

For purposes of description herein, the terms "upper," "lower," "right," "left," "rear," "front," "vertical," "horizontal," "interior," "exterior," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-20, a storage container 10 for a vehicle seating assembly 14 includes a base 18 of the storage container 10 affixed to a seatback 22, a panel 26 coupled to the base 18, and a latch mechanism 30 disposed in the base 18 and adjacent to the panel 26. The latch mechanism 30 is selectively operable between locked and unlocked positions 34, 38 to move the panel 26 between respective secured and unsecured positions 42, 46.

Referring to FIG. 1, a vehicle interior 50 includes a passenger side seating assembly 54 and a driver side seating assembly 58. The passenger side seating assembly 54 is equipped with a seat 62 and a seatback 22 with a storage container 10 for storing one or more passenger items. The seatback 22 of the passenger side seating assembly 54 and the storage container 10 are in a substantially horizontal position 66. The storage container 10 includes an open storage space 70 and an enclosed storage space 74. The storage container 10 is positioned near the driver side seating assembly 58 so that a driver may conveniently access the storage container 10 while seated in the driver side seating assembly 58. When the storage container 10 is in the substantially horizontal position 66, the driver may store passenger items such as writing utensils and change in the open storage spaces 70. The driver may support a laptop computer on the work surface 78, or the driver may use the work surface 78 as a writing surface. Passengers seated in rear seats 82 may access passenger items stored in the open storage space 70. Passengers seated in the rear seats 82 may place a laptop computer or entertainment device on the work surface 78 to view the laptop computer or entertainment device while they are seated in the rear seats 82. The enclosed storage space 74 is accessible to passengers in the driver side seating assembly 58 and the rear seats 82. In the depicted embodiment, the enclosed storage space 74 may be accessed through a panel 26.

Figure 2:
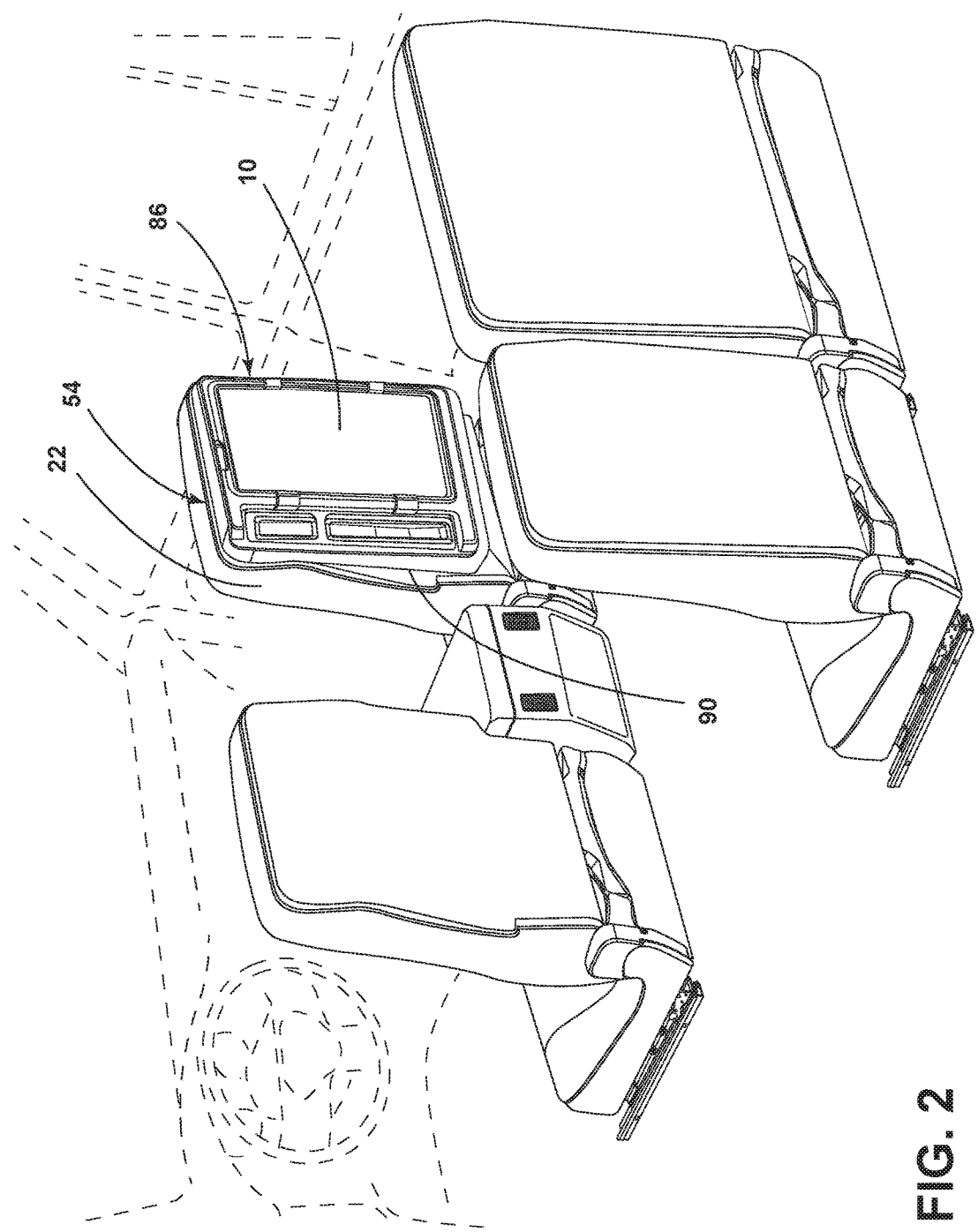
FIG. 2 is a side perspective view of the vehicle interior with the seatback including the container of FIG. 1 in a substantially vertical position.

Referring to FIG. 2, the seatback 22 of the passenger side seating assembly 54 and the storage container 10 are shown in a substantially vertical position 86. The storage container 10 is attached to the outward facing surface 90 of the seatback 22.

Figure 3:
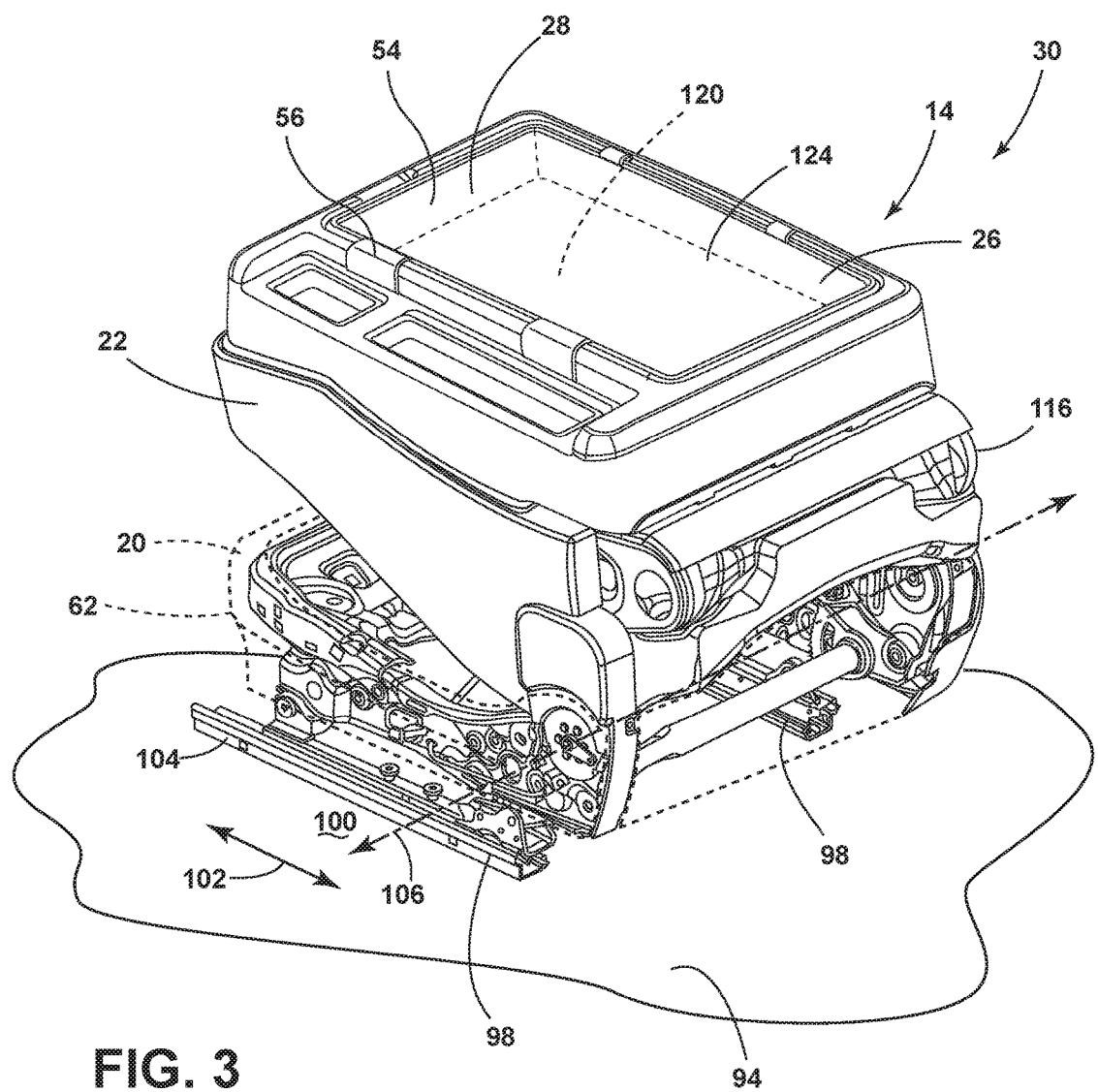
FIG. 3 is a side perspective view of the seatback including a container of FIG. 1 in a substantially horizontal position.

Referring to FIG. 3, the passenger side seating assembly 54 is coupled to a floor 94 with rails 98. The passenger side seating assembly 54 is movable along the rails 98 in a longitudinal direction shown by an arrow 102. The seatback 22 is pivotally coupled to the seat 62 and rotates around an axis 106 defined by a pivotable coupling between the seat 62 and the seatback 22.

Referring to FIG. 4, the storage container 10 is shown with the panel 26 in the secured position 42. Hinges 110 are disposed on the longitudinal side 114 of the panel 26 closest to the open storage spaces 70. Strikers 118 are disposed on the opposing longitudinal side 122 of the panel 26. The strikers 118 are disposed in a securing position 126 to retain the panel 26 in the closed or secured position 42.

Referring to FIG. 5, the storage container 10 is shown with the panel 26 in the fully open position 130. Two handles 134 are disposed in the interior 138 of the storage container 10. The handles 134 are rotatable in the directions depicted by the arrows 142 to activate cam latches 146 disposed behind the handles 134.

Figure 6:
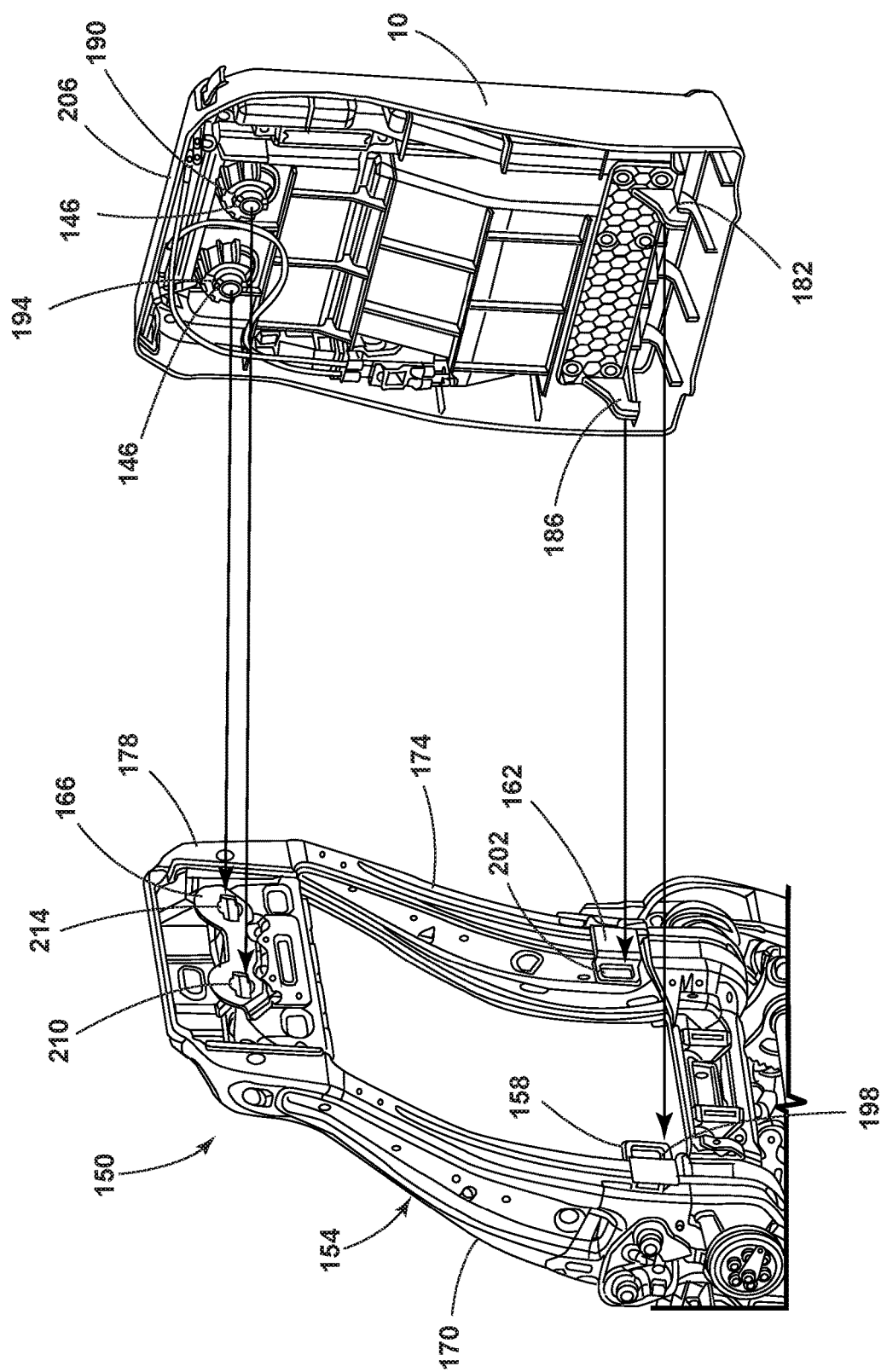
FIG. 6 is a perspective view of the storage container positioned to be attached to a frame assembly of an embodiment.

Referring to FIG. 6, the cam latches 146 are disposed in the storage container 10. A frame assembly 150 includes a frame 154, a first bracket 158, a second bracket 162, and a third bracket 166. The first bracket 158 is attached to a first side 170 of a frame 154. The second bracket 162 is attached to a second side 174 of a frame 154. The third bracket 166 is attached to an upper area 178 of a frame 154. The first bracket 158, the second bracket 162, and the third bracket 166 are configured to receive a selectively attachable storage container 10. The storage container 10 includes a first protrusion 182, a second protrusion 186, a first mounting member 190, and a second mounting member 194. The first protrusion 182 is inserted in the first aperture 198 of the first bracket 158. The second protrusion 186 is inserted in the second aperture 202 of the second bracket 162. The first and second mounting members 190, 194 (including cam latches 146) secure the upper portion 206 of the storage container 10 to the third and fourth apertures 210, 214 in the third bracket 166. The storage container 10 may be selectively attached to and detached from the frame assembly 150.

Figure 7:
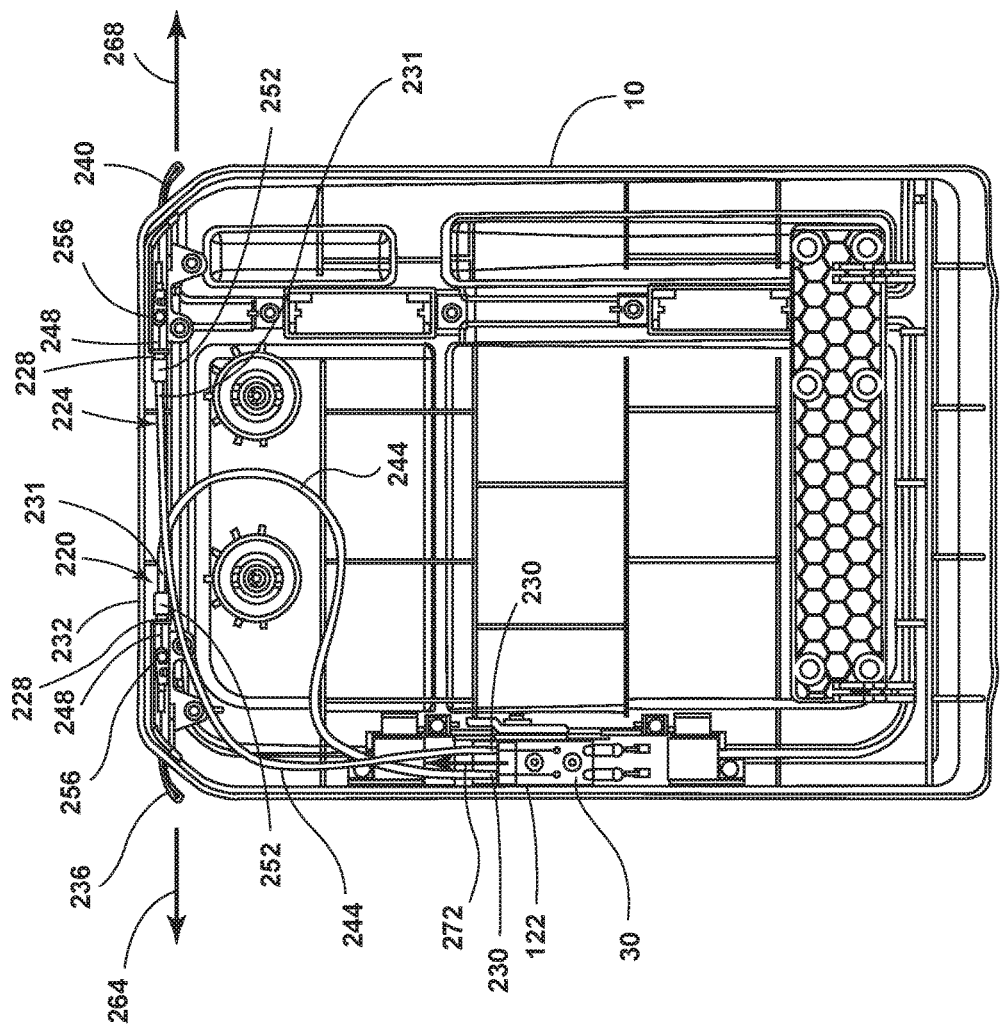
FIG. 7 is a bottom plan view of a storage container according to an embodiment.

Referring to FIG. 7, a bottom plan view of the storage container 10 shows the latch mechanism 30 disposed at a longitudinal side 122 of the storage container 10. A first cable assembly 220 and a second cable assembly 224 are disposed between the latch mechanism 30 and in an inner wall 228 of the storage container 10 proximate a top edge 232 of the storage container 10. The first and second cable assemblies 220, 224 have first ends 230 coupled to the latch mechanism 30 and second ends 231 secured within the storage container 10. The first and second cable assemblies 220, 224 are each attached to first and second pull straps 236, 240 that are disposed outside of the storage container 10. The first and second pull straps 236, 240 are proximate a top edge 232 of the storage container 10. The first and second cable assemblies 220, 224 each include a sheath 244, a cable 248, and bushings 252. The sheath 244 guides a cable 248 through the storage container 10. The first pull strap 236 and the second pull strap 240 are attached to the ferrules 256 of the cables 248. The latch mechanism 30 may be activated by pulling either the first pull strap 236, the second pull strap 240, or the first and second pull straps 236, 240 in the directions depicted by arrows 264, 268. Activation of the latch mechanism 30 from the locked to the unlocked position 34, 38 causes the latch mechanism 30 to move linearly in the direction depicted by arrow 272.

Referring to FIG. 8, a side elevational view of the panel 26 is shown. The edge 280 of the panel 26 includes two contact areas 284 that the two strikers 118 engage when the panel 26 and the strikers 118 are in the respective secured and securing positions 42, 126.

Referring to FIG. 9, a side perspective view of a sidewall 290 of the storage container 10 with a cam 294 in a stored position 298 and the strikers 118 in the securing positions 126 is shown. The strikers 118 include apertures 302 for receiving an edge 280 of the panel 26.

Referring to FIG. 10, a side perspective view of a sidewall 290 of the storage container 10 with a cam 294 in the deployed position 306 and the strikers 118 in non-securing positions 310 is shown.

Figure 11:
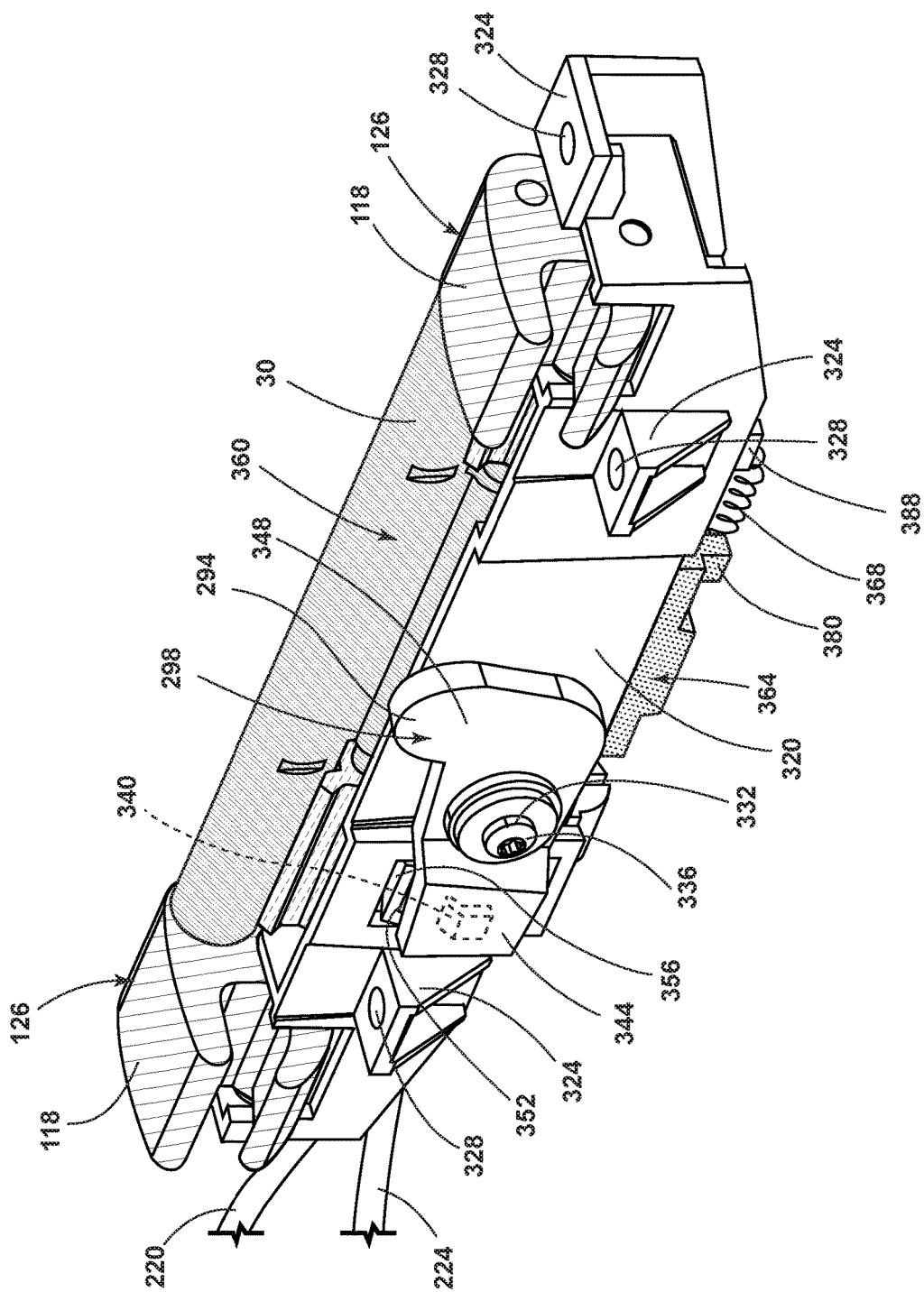
FIG. 11 is a side perspective view of the latch mechanism in a housing in a locked position, the cam member in a stored position, and strikers in the securing position of an embodiment.

Referring to FIG. 11, the latch mechanism 30 is shown disposed within a housing 320. The housing 320 includes several flanges 324 with holes 328 for mounting the housing 320 within a sidewall 290 of the storage container 10. The holes 328 receive fasteners that mount the housing 320 to the sidewall 290. The latch mechanism 30 includes an arm assembly 360 and an actuator assembly 364. The cam member 348 is disposed outside of the housing 320. The cam member 348 is coupled to the housing 320. A fastener 336 attaches the cam member 348 to the housing 320. A protrusion 340 is disposed on the lever arm 344 of the cam member 348. The protrusion 340 engages a recess 352 of the lower arm 356 of the arm assembly 360 of the latch mechanism 30. The first cable assembly 220 and the second cable assembly 224 extend from the housing 320. An extension spring 368 is engaged to the latch mechanism 30 and the housing 320. Strikers 118 are coupled to the arm assembly 360.

Referring to FIG. 12, a bottom plan view of a latch mechanism 30 in a locked position 34 is shown. A cam member 348 is connected to the latch mechanism 30. The lever arm 344 of the cam member 348 is coupled to the lower arm 356 of the arm assembly 360. The first and second cable assemblies 220, 224 include cables 248 that are attached to the latch mechanism 30. When the latch mechanism 30 is in the locked position 34, the extension springs 368 are in an unextended state 372. The extension springs 368 have first ends 376 attached to protrusions 380 on the actuator assembly 364 and second ends 384 attached to protrusions 388 on the housing 320 (FIG. 11). The latch mechanism 30 includes first and second engagement members 392, 396 disposed on the lower arm 356 of the arm assembly 360. The first and second engagement members 392, 396 are positioned to move into first and second notches 400, 404 in the lock rod 408 of the actuator assembly 364 when the actuator assembly 364 moves linearly from the rest position 412 to the activation position 416 in the direction shown by arrow 420. With reference to FIGS. 11-18, when the first and second engagement members 392, 396 release into the first and second notches 400, 404, then the arm assembly 360 rotates to move the lever arm 344 of the cam member 348 around the fastener 336 to move the cam 294 from the stored position 298 to the deployed position 306.

Referring to FIG. 13, a bottom plan view of the latch mechanism 30 is shown in an unlocked position 38. The latch mechanism 30 has moved in the direction depicted by arrow 420 in FIG. 12 when an activation force (arrow 264 and/or arrow 268) (FIG. 7) has been exerted on one or more of the first and second cable assemblies 220, 224. The first and second notches 400, 404 in the lock rod 408 have moved linearly with the actuator assembly 364 in the direction depicted by arrow 420. When the latch mechanism 30 is in the locked position 34, the first and second engagement members 392, 396 are not disposed in the first and second notches 400, 404. When the latch mechanism 30 is in the unlocked position 38, the first and second engagement members 392, 396 are disposed in the first and second notches 400, 404. When an activation force depicted by arrow 420 in FIG. 12 is applied to the latch mechanism 30, the lower arm 356 of the arm assembly 360 of the latch mechanism 30 rotates downward so that the protrusion 340 of the cam lever arm 344 disposed in the recess 352 of the arm assembly 360 rotates about the fastener 336 and pivots downward as the lower arm 356 of the arm assembly 360 rotates downward. The cam member 348 pivots around the cam member pivot point 332 at the fastener 336, and the cam 294 moves upward to the deployed position 306 to press on the underside 424 of the panel 26. The pressure exerted on the underside of the panel 26 by the cam 294 causes the panel 26 to move from the secured position 42 to the unsecured position 46. When the latch mechanism 30 is in the unlocked position 38, the extension springs 368 are in an extended state 428.

Referring to FIG. 14, a side perspective view of the latch mechanism 30 in the locked position 34 is shown. The actuator assembly 364 includes the cable lock actuator 440 and the lock rod 408. The arm assembly 360 includes the lower arm 356 and the upper arm 444. The cam 294 is in the stored position 298. The strikers 118 are in the securing position 126. In the depicted embodiment, the strikers 118 in the securing position 126 receive the panel 26 in the secured position 42, and the top surfaces 448 of the strikers 118 are substantially parallel with the top surface 452 of the panel 26. Torsion springs 456 are disposed in the arm assembly 360. Arrow 258 depicts the upward force that the cam 294 will exert on the underside 424 of the panel 26 to move the panel 26 from the secured position 42 (FIG. 14) to the unsecured position 46 (FIG. 16).

Referring to FIGS. 14-17, the strikers 118 have a stationary first pivot point 460 defined by a first axis 464 that extends through rods 468 that extend from the strikers 118 into the sidewall 290 and couple the strikers 118 to the sidewall 290. The strikers 118 pivot about the first axis 464 from the securing position 126 to the non-securing position 310. The strikers 118 have a movable second pivot point 472. The second pivot point 472 moves when the arm assembly 360 moves. The lower arm 356 has a stationary first pivot point 480 defined by a first axis 484 of the lower arm 356. The lower arm 356 has a movable second pivot point 488 at a rod 496 that couples the lower arm 356 to the upper arm 444. The second pivot point 488 of the lower arm 356 moves when the arm assembly 360 moves.

Referring to FIG. 15, the striker 118, the arm assembly 360, the actuator assembly 364, and the cable assemblies 220, 224 are shown. The protrusion 340 of the cam member 348 is shown disposed in the recess 352 of the lower arm 356.

Referring to FIG. 16, a side perspective view of the latch mechanism 30 in the unlocked position 38 is shown. The arm assembly 360 is shown in the second position 520. The cam 294 is in the deployed position 306. The strikers 118 are in the non-securing positions 310. The linear movement of the actuator assembly 364 from the rest position 412 (FIG. 14) to the activation position 416 (FIG. 16) has caused rotational movement of the arm assembly 360 in the direction shown by arrow 498 that causes the cam member 348 to pivot about the fastener 336 and to move the cam 294 in the upward direction. Torsion springs 456 are disposed in the arm assembly 360 and about first axis 464 of first striker pivot point 460. The torsion springs 456 exert torsion forces 504, 508 (FIGS. 18, 19) on the arm assembly 360. The panel 26 is in the unsecured position 46. Arrow 497 shows a downward force that is exerted on the panel 26 to move the panel 26 from the unsecured position 46 (FIG. 16) to the secured position 42 (FIG. 14).

With reference to FIG. 17, a cross-sectional view taken along XVII-XVII of FIG. 16 is shown. The protrusion 340 of the cam member 348 is shown in the recess 352 of the lower arm 356. The striker 118 is in the non-securing position 310. The striker first pivot point 460 is in substantially the same position as it was in FIG. 15. The striker second pivot point 472 has moved to a new position relative to its position in FIG. 15. The lower arm first pivot point 480 is in substantially the same position it was in in FIG. 15. The lower arm second pivot point 488 has moved to a new position relative to its position in FIG. 15.

Referring to FIG. 18, a schematic cross-sectional view shows the arm assembly 360 of the latch mechanism 30 in the first position 500. Specifically, the lower arm 356, the upper arm 444, and the striker 118 are shown. The striker 118 is in the securing position 126. The striker first pivot point 460, the striker second pivot point 472, the lower arm first pivot point 480, and the lower arm second pivot point 488 are also shown. With reference to FIGS. 14-19, a torsion force depicted by arrows 504 and 508 represents a force exerted by torsion springs 456. The torsion force (arrow 504 in FIG. 18 and arrow 508 in FIG. 19) helps the arm assembly 360 move the striker 118 from the securing position 126 to the non-securing position 310.

Referring to FIG. 19, a schematic cross-sectional view shows the arm assembly 360 of the latch mechanism 30 in the second position 520. The striker 118 is in the non-securing position 310. A torsion force is shown by the arrow 508. The torsion force shown by arrow 508 acts on the arm assembly 360 and retains the striker 118 in the non-securing position 310 after the striker 118 has released the panel 26.

Figure 20:
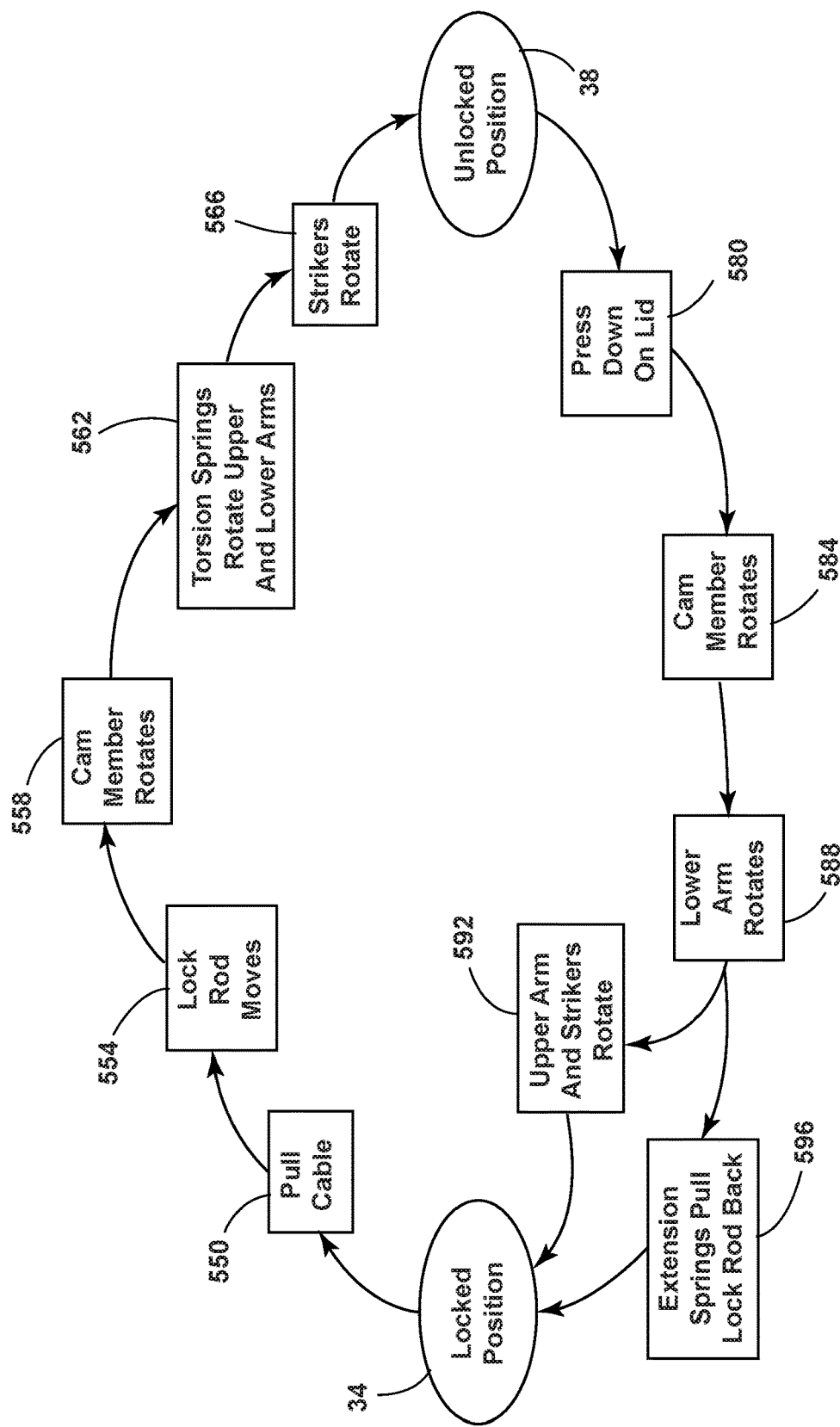
FIG. 20 is a flow chart explaining movement of the latch mechanism from a locked position to an unlocked position and from an unlocked position to a locked position of an embodiment.

With regard to FIG. 20, a flow chart shows an exemplary sequence for moving the latch mechanism 30 from the locked position 34 to the unlocked position 38 and an exemplary sequence for moving the latch mechanism 30 from the unlocked position 38 to the locked position 34. Moving from the locked position 34 to the unlocked position 38, the first step 550 is pulling a cable 248. Next, the lock rod 408 moves (step 554). During step 558, the cam member 348 rotates. Next, torsion springs 456 rotate the upper and lower arms 444, 356 during step 562. Afterwards, strikers 118 rotate (step 566). The latch mechanism 30 is in the unlocked position 38. Referring now to steps 580-596 between the unlocked position 38 and the locked position 34, a user presses down on the lid (panel 26) in step 580. Next, the cam member 248 rotates in step 584. During step 588, the lower arm 356 rotates. Next, the upper arm 444 and strikers 118 rotate (step 592) while the extension springs 368 pull the lock rod 408 back (step 596). The latch mechanism 30 is in the locked position 34.

From the forgoing and with reference to FIGS. 1-20, it will also be seen that a vehicle seating assembly 14 includes a seatback 22 and a storage container 10 disposed on the seatback 22. The storage container 10 includes a door (e.g., panel 26), a latch mechanism 30, and a cable assembly 220. The cable assembly 220 has a first end 230 coupled to the latch mechanism 30 and a second end 231 secured within the storage container 10. The cable 248 is selectively operable to move the latch mechanism 30 from the locked position 34 to the unlocked position 38. The vehicle seating assembly 14 also includes a cam member 348. The cam member 348 is coupled to the latch mechanism 30. Moving the latch mechanism 30 from a locked position 34 to an unlocked position 38 causes the cam member 348 to move from a stored position 298 to a deployed position 306 so that the cam member 348 exerts a force (arrow 258 in FIG. 14) on the door to move the door from a secured position 42 to an unsecured position 46.

From the forgoing and with reference to FIGS. 1-20, it will be seen that a selectively detachable storage container 10 for a seating assembly (e.g., a vehicle seating assembly, an entertainment complex seating assembly) includes a base 18 of the storage container 10 attached to a seatback 22, a panel 26 coupled to the base 18, and a cam member 348 operable between a deployed position 306 and a stored position 298 and coupled to a latch mechanism 30 operable between an unlocked position 38 and a locked position 34. The panel 26 is selectively positionable to exert a closing force (arrow 497 in FIG. 16) on the cam member 348 and to move the cam member 348 from the deployed position 306 to the stored position 298 to move the latch mechanism 30 from the unlocked position 38 to the locked position 34. The selectively detachable storage container 10 for a seating assembly may also include a biasing mechanism. The biasing mechanism is attached to the latch mechanism 30 and the biasing mechanism retracts an actuator assembly 364 of the latch mechanism 30 and the biasing mechanism retracts an actuator assembly 364 of the latch mechanism 30 from an activation position 416 to a rest position 412 when the latch mechanism 30 is moved from the unlocked position 38 to the locked position 34. In the depicted embodiment, the biasing mechanism includes an extension spring 368 including a first end 376 coupled to the actuator assembly 364 and a second end 384 coupled to a housing 320. The actuator assembly 364 is disposed within the housing 320.

In various embodiments, the housing 320 and the latch mechanism 30, along with the cam member 348 and the first and second cable assemblies 220, 224 may be disposed along various edges 280 of the panel 26.

In various embodiments, the first and second cable assemblies 220, 224 may be activated by a push button, toggle, motor, or other activation method.

In various embodiments, the pull straps may be handles.

In various embodiments, the biasing mechanism may be electrical.

A variety of advantages may be derived from use of the present disclosure. The storage container 10 is one of various attachments that may be attached to the frame assembly 150 on the passenger seatback 22. The passenger seatback 22 may be customized by adding a specific storage container 10 or other item to the seatback frame assembly 150. Vehicle interior space is limited, and the disclosure makes use of a previously unused surface (i.e., the rearward facing seatback surface) to add more functionality to the vehicle interior 50 while maintaining the functionality of a standard passenger seat and preserving passenger leg room and seating space. The latch mechanism 30 for the storage container 10 provides a safe way to keep the panel 26 in the secured position 42 when the seat 62 is moved from the horizontal position to the vertical position. Furthermore, the latch mechanism 30 helps keep items contained in the storage container 10 during a vehicle crash or a similar event. The first and second pull straps 236, 240 for opening the storage container 10 disposed outside of the storage container 10 provide an easy way to open the storage container 10. Further, the location of the first and second pull straps 236, 240 away from the latch mechanism 30 unclutters the appearance of the latch mechanism 30.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A storage container for a vehicle seating assembly, comprising: a base of the storage container affixed to a seatback;
   a panel coupled to the base;
   a latch mechanism disposed in the base and adjacent to the panel, wherein the latch mechanism is selectively operable between locked and unlocked positions to move the panel between respective secured and unsecured positions;
   wherein the latch mechanism comprises an actuator assembly and an arm assembly retained in a housing, and wherein linear movement of the actuator assembly from a rest position to an activation position causes rotation of the arm assembly from a first position to a second position.

2. The storage container for a vehicle seating assembly of claim 1, further comprising:
   a cam member coupled to the arm assembly, wherein rotation of the arm assembly from the first position to the second position causes the cam member to move from a stored position to a deployed position.

3. The storage container for a vehicle seating assembly of claim 2, wherein the cam member is disposed adjacent to the panel and wherein movement of the cam member from the stored position to the deployed position causes the cam member to contact the panel and to exert a force on the panel to move the panel from the secured position to the unsecured position.

4. The storage container for a vehicle seating assembly of claim 3, further comprising:
   a spring member that exerts a spring force on the arm assembly to move the arm assembly from the first position to the second position.

5. The storage container for a vehicle seating assembly of claim 4, further comprising: a striker, wherein the striker is coupled to the arm assembly.

6. The storage container for a vehicle seating assembly of claim 5, wherein the striker includes an aperture for receiving an edge of the panel in the secured position.

7. The storage container for a vehicle seating assembly of claim 6, wherein a top surface of the striker and a top surface of the panel are substantially parallel when the aperture in the striker receives an edge of the panel in the secured position.

8. The storage container for a vehicle seating assembly of claim 4, wherein the spring member is a torsion spring.

9. The storage container for a vehicle seating assembly of claim 1, wherein an activation force is applied to the actuator assembly to move the actuator assembly from a rest position to an activation position.

10. The storage container for a vehicle seating assembly of claim 9, further comprising:
    a cable coupled to the actuator assembly and selectively operable to apply the activation force to the actuator assembly to move the actuator assembly from the rest position to the activation position.

11. The storage container for a vehicle seating assembly of claim 10, wherein the cable comprises a first end and a second end, wherein the first end is attached to the actuator assembly and the second end is secured in an inner wall of the storage container.

12. A vehicle seating assembly, comprising:
    a seatback; and
    a storage container disposed on the seatback and comprising:
    a door;
    a latch mechanism disposed between the door and a side of the storage container;
    a cable assembly having a first end coupled to the latch mechanism and a second end secured within the storage container, wherein a cable is selectively operable to move the latch mechanism from the locked position to the unlocked position to move the door from a secured position to an unsecured position; and
    a cam member, wherein the cam member is coupled to the latch mechanism and wherein moving the latch mechanism from a locked position to an unlocked position causes the cam member to move from a stored position to a deployed position so that the cam member exerts a force on the door to move the door from the secured position to the unsecured position.

13. The vehicle seating assembly of claim 12, wherein a handle is coupled to the second end of the cable assembly and wherein the handle is outside of the storage container.

14. The vehicle seating assembly of claim 13, wherein the second end of the cable assembly is secured in an inner wall of the storage container proximate a top edge of the storage container and wherein the handle is proximate the top edge of the storage container.

15. The vehicle seating assembly of claim 13, wherein the cable assembly is one of a plurality of cable assemblies having a first end coupled to the latch mechanism and a handle coupled to the second end, wherein the handle is disposed outside of the storage container.

16. A selectively detachable storage container for a seating assembly, comprising: a base affixed to a seatback;
a panel coupled to the base; and
a cam member operable between a deployable position and a stored position and coupled to a latch mechanism operable between an unlocked position and a locked position, wherein the panel is selectively positionable to exert a closing force on the cam member and to move the cam member from the deployed position to the stored position to move the latch mechanism from the unlocked position to the locked position.

17. The selectively detachable storage container for a seating assembly of claim 16, further comprising:
a biasing mechanism attached to the latch mechanism and wherein the biasing mechanism retracts an actuator assembly of the latch mechanism from an activation position to a rest position when the latch mechanism is moved from the unlocked position to the locked position.

18. The selectively detachable storage container for a seating assembly of claim 17, wherein the biasing mechanism comprises an extension spring including a first end coupled to the actuator assembly and a second end coupled to a housing, wherein the actuator assembly is disposed within the housing.

* * * * *